United States Patent [19]

Gill

[11] Patent Number: 5,482,665

[45] Date of Patent: Jan. 9, 1996

[54] METHOD/APPARATUS FOR MAKING FIBER-FILLED CUSHION

[75] Inventor: Prem P. Gill, Rochester Hills, Mich.

[73] Assignee: General Motors Corporation, Detroit, Mich.

[21] Appl. No.: 214,510

[22] Filed: Mar. 18, 1994

[51] Int. Cl.⁶ .............. B29C 35/02; B29C 35/16; B29C 43/20; B29C 43/02

[52] U.S. Cl. .......... 264/113; 264/121; 264/122; 425/412; 425/420; 425/422

[58] Field of Search ............... 264/517, 113, 264/121, 122, DIG. 69; 425/414, 422, 420, 412, 130

[56] References Cited

U.S. PATENT DOCUMENTS

| | | | |
|---|---|---|---|
| 3,439,397 | 4/1969 | Marshak | 29/91 |
| 4,031,179 | 6/1977 | Tatzel | 264/517 |
| 4,568,581 | 2/1986 | Peoples, Jr. | 264/122 |
| 4,608,213 | 8/1986 | Kurumizawa et al. | 264/122 |
| 4,812,283 | 3/1989 | Farley et al. | 264/518 |
| 5,111,579 | 5/1992 | Andersen | 29/897.32 |
| 5,229,052 | 7/1993 | Billiu | 264/115 |
| 5,366,678 | 11/1994 | Nomizo et al. | 264/122 |
| 5,378,296 | 1/1995 | Vesa | 264/122 |

Primary Examiner—Mary Lynn Theisen
Attorney, Agent, or Firm—Lawrence B. Plant

[57] ABSTRACT

Method and apparatus for quickly, and substantially uniformly, heating and cooling a bed of polymeric fibers having high melting point and low melting point fibers therein for softening the low melting point fibers and bonding them to the high melting point fibers to form a seat cushion. Hot and cool gases are flowed through the bed of fibers to effect the heating/cooling.

35 Claims, 6 Drawing Sheets

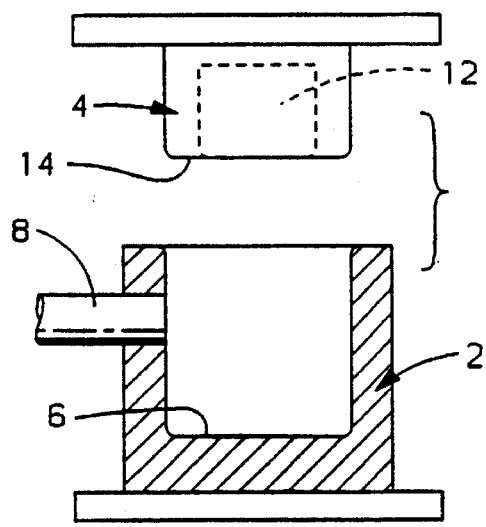
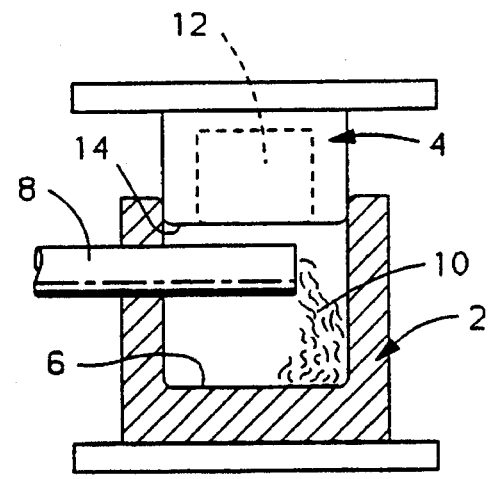
FIG. 1A  FIG. 1B
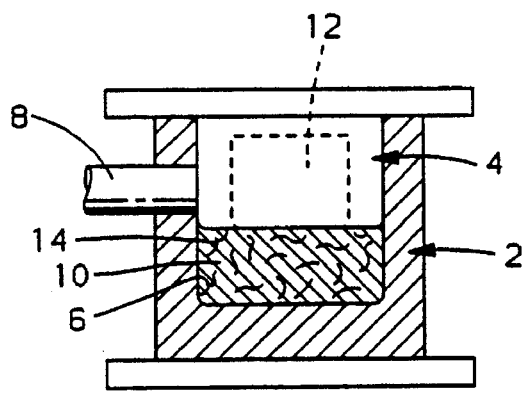
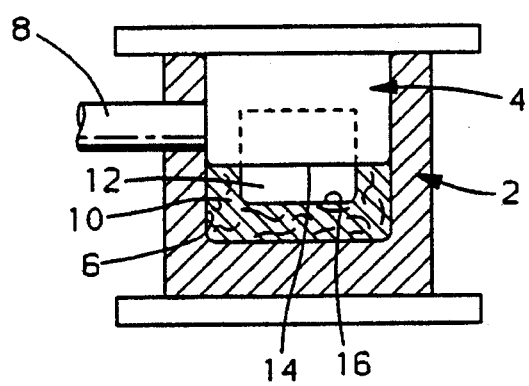
FIG. 1C  FIG. 1D

METHOD/APPARATUS FOR MAKING FIBER-FILLED CUSHION

This invention relates to a method/apparatus for making cushions from a mixture of polymeric fibers having different melting points wherein the lower melting point fibers serve as a binder for the higher melting point fibers.

BACKGROUND OF THE INVENTION

Automobile seats (i.e., seats and backrests) have heretofore, for the most part, been made from fabric-covered foam cushion material. The furniture industry has found that fiber cushions are more durable than foam, more breathable than foam, less costly than foam, more readily recyclable than foam, and do not emit gases during processing. Such cushions would offer similar advantages to automobile manufacturers desirous of reducing costs and increasing the recyclable content of its vehicles.

It is known to make fiber-filled cushions from mixtures of high melting point and low melting point fibers by heating the mixture in an oven so as to soften and unite the low melting fibers (hereafter bonding fibers) with the high melting fibers (hereafter matrix fibers) at their points of intersection, anti then cooling the mixture sufficiently to bond the bonding fibers to the matrix fibers. Typically, the bonding fibers comprise only about 25% to about 30% by volume of the fiber mix, but more or less may be used. It is difficult to achieve uniform of the fibers in an oven in a short processing cycle time and this difficulty increases as the thickness of the cushions increases. Often the fibers at the center of the cushion do not fuse as well as those closer to the surface of the cushion. Attempts to accelerate heating in the center of the mixture by increasing the oven temperature only serves to overheat the fibers closer to the surface. Such a process is not only difficult to control but results in a nonuniform product. On the other hand, using lower oven temperatures, and consequently longer heating times adds to the cycle time and cost of the process.

It is a principle object of the present invention to provide a unique, readily controllable process and apparatus for quickly and substantially uniformly heating a mixture of high and low melting point fibers to make a seat cushion, and particularly a process/apparatus which is readily adaptable to producing cushions with distinct zones having different physical properties (e.g., softness). This and other objects and advantages of the present invention will become more readily apparent from the detailed description thereof which follows.

SUMMARY OF THE INVENTION

Methodwise, the present invention comprehends a technique for making a porous, breathable, recyclable seat cushion from a mixture of polymeric matrix fibers having a first melting point and polymeric bonding fibers having a second melting point which is lower than that of the matrix fiber wherein the bonding fibers are softened and unite with the matrix fibers so as to act like a binder holding the fibers together in a desired shape. More specifically, the fiber mixture is introduced into a mold cavity having a shape conforming substantially to the desired shape of the cushion. The fibers are compressed in the mold cavity to the density and shape, and heated gas passed therethrough for a time and at a temperature sufficient to soften and unite the lower melting bonding fibers to the higher melting matrix fibers at their points of intersection. Thereafter, cooling gas is passed through the mixture for a time and at a temperature sufficient to bond the bonding and matrix fibers together such that the mixture retains the shape of the mold cavity. For economic, environmental and convenience reasons the heated gas will preferably comprise air. Other gases, e.g., nitrogen, may be used but are seen to offer no advantages and only add to the cost. Cooling of the fiber mixture in the mold will preferably be accomplished by passing cooling gas (preferably air) through the fibers in essentially the same manner as the heated gas is passed therethrough to soften the bonding fibers and weld them to the matrix fibers. The fibers will comprise any of a variety of natural or synthetic polymeric materials known to be useful for such applications including polyethylene, polypropylene, polyamide, aramides and polyesters. Preferably, the fibers will comprise a mixture of high and low melting species of polyethylene terephthalate (hereinafter (PET), because such fibers have better durability, compression recovery and are readily recyclable.

While for simplicity and recyclability, the bonding fibers will preferably comprise the same type of polymer (e.g., all polyesters) as the matrix fibers, the bonding fibers may comprise a different polymer than the matrix fibers. Hence, for example, polyester matrix fibers may be admixed with polypropylene bonding fibers. The matrix fibers will vary in length from about 1¼ inches to about 1½ inches, vary in diameter from about 15 denier to about 25 denier, and comprise about 70 percent to about 75 percent by volume of the fiber mixture. Similarly, the bonding fibers will vary in length from about 1¼ inches to about 1½ inches, vary in diameter from about 6 denier to about 9 denier, and comprise about 25 percent to about 30 percent by volume of the fiber mixture. Commercially available synthetic fibers useful with the present invention include, for example:

1. Polypropylene fibers sold by the Fibres South Co. of Trussville, Ala., under the trade name Poly-Star®;
2. Polyethylene and Polypropylene fibers sold by the Hercules Co. of Norcross, Ga.;
3. Polyethylene Terephthalate fibers sold by the Hoechst Celanese Co. of Charlotte, N.C., under the trade names Trevira and Celbond;
4. Polyamide, aramide and polyethylene terephthalate fibers sold by the E. I. duPont deNemours Co., under the trade names Nylon, Nomex/Kevlar and Dacron, respectively; and
5. Polyethylene terephthalate fibers sold by the Eastman Chemical Products Co. under the trade name Kodel.

With the mold partially open, the fiber mixture is preferably blown into the mold cavity while, at the same time, a current of air is directed downwardly onto the mixture entering the mold so as to help distribute and pack the fibers substantially evenly in the mold cavity. After the mold is closed and the fibers compressed, PET mixtures will have bulk density of about 1.75 lbs./ft.$^3$ to about 2.5 lbs./ft.$^3$ which represents about 2 percent to about 3 percent by volume fibers and the remaining voids (i.e., about 97 percent–98 percent porous). The density of any particular cushion will vary with the composition and specific gravity of the particular fibers used. The fiber mix will typically comprise about 25 percent to about 30 percent by volume bonding fibers. Preferably, the bonding fibers will have a melting point at least about 60° C. lower than the melting point of the matrix fibers such that substantially only the bonding fibers will soften during the heating step. Most preferably, the melting point differential will be above 70°–80° C. Preferably, the melting point of the matrix fibers will be at least about 250° C., and the melting point of the bonding fibers between about 150° C. and about 210° C. In accordance with a most preferred embodiment of the invention, the melting point of the matrix fibers will be at least about 260° C., and the melting point of the bonding fibers will be about 180° C., or more depending on the melting point of the matrix fibers.

In accordance with another aspect of the present invention, a cushion will be made with at least two zones having with different physical properties (e.g., compressibility/softness). In this regard, a first mixture of fibers is introduced into the mold and compressed in the manner described above. Thereafter, appropriate tooling further compresses a selected portion of the first mixture to form a depression therein adapted to receive a second mixture of fibers. The cushion is then heated and cooled in the manner described above so as to form the cushion with the depression therein. Thereafter, the second mix of fibers is dispensed into the depression, and compressed therein followed by heating and cooling, as discussed above, so as to bond the fibers of the second mix to themselves and to the fibers of the first mix forming the first zone of the cushion. In accordance with this latter embodiment, the second mix of fibers may have a different chemical composition than the first mix forming the first zone of the cushion, or, may have the same chemical composition of the first mix but is simply formed with more or less density than that comprising the first zone of the cushion. Hence for example, the perimetrical zones of the cushion may have a higher density than the central zone of the cushion and may be achieved by simply compressing the mixture in the central zone (i.e., in the depression) by a lesser amount than mix in the perimetrical zone surrounding the central zone.

Once the composition and the melting points of the fibers have been selected, the process is readily controllable by simply monitoring the temperature of the heating/cooling gases at different sites in the system. In this regard, the temperature of the gas is measured just before it enters the fiber mixture and again just as it exits the fiber mixture. When the temperature of the exiting gas approaches the temperature of the entering gas, heating is discontinued and cooling gas admitted to the mixture. Thereafter, when the temperature of the cooling gas exiting the mixture approaches the temperature of the cooling gas entering the mixture, the cooling gas is discontinued, the mold opened and the cushion ejected. Preferably the temperature and flow rate of the heating gas is selected so as to soften the bonding fibers after approximately five minutes into the heating cycle.

In accordance with another aspect of the invention, the aforesaid process is carried out in certain preferred equipment. The preferred apparatus includes a female mold member comprising a plurality of walls defining a mold cavity, at least one of which walls (preferably the bottom wall) is gas permeable. A male mold member, nestable within the mold cavity, is adapted for reciprocal movement into and out of the mold cavity for compressing the fiber mixture therein. The male mold member preferably also has a gas-permeable wall positioned opposite the other gas-permeable wall in the female mold member. A gas plenum system surrounds the gas-permeable walls for providing gases (e.g., air) to the mold cavity for heating and cooling the mixture therein. A source of pressurized gas (e.g., a blower) communicates with the plenum system for pumping gas through the gas-permeable walls and the mixture of fibers in the mold cavity. A heater communicates with the blower for heating the gas to a temperature sufficient to soften the low melting point bonding fibers in the mix. For the quickest cycle time and most uniform properties, the gas flow is preferably evenly distributed across the entire cushion and flows through the thinnest cross section of the cushion (e.g., bottom-to-top of a seat cushion) while the gases could be flowed from side-to-side or front-to-back (i.e., in the thicker direction of the cushion). It takes longer to achieve uniform heating of the cushion. The direction of flow in the plenum system may be reversed such that either the plenum associated with the female mold portion or male mold portion is the first to receive the gas and the other plenum serves to exhaust the gas.

For filling, at least one injector (and preferably four) enters the mold cavity through an opening(s) in one of the side walls of the mold for dispensing the mixture of fibers into the cavity from a remote source thereof connected to the other end of the injector. Most preferably, the injector(s) passes through an opening in the side of the mold cavity to deliver the mixture thereto and then retracts out of the cavity to permit the male mold member to move unimpeded into and out of the cavity during its compression and retreat cycle. An appropriate drive mechanism (e.g., preferably a ball and screw device) engages the injector for effecting the movement of the injector into and out of the cavity. Alternatively, hydraulic/pneumatic cylinders or pack and pinion devices could be used for this purpose. The drive mechanism will initially extend the injector well into the mold cavity (i.e., almost to the wall of the cavity opposite the wall having the hole through which the injector enters the cavity). After the fiber begins to flow from the injector into the cavity, the injector is slowly retracted from its initial extended position so as to deposit a substantially uniform layer of fibers onto the floor of the mold cavity. A blower (not shown) coupled to the plenum associated with the male mold member causes a current of downwardly flowing air to pack the fibers into the bottom of the mold cavity. The fibers will preferably be fed into the injector by means of a jet of gas (i.e., air) flowing into the other end of the injector so as to create a vacuum and draw airborne fibers into the injector from a source of such fibers.

A stripper plate engages the cushion in the cavity for ejecting the cushion from the cavity after the cushion has cooled sufficiently for the cushion to retain the desired shape. The stripper plate forms a part of one of tile walls of the mold cavity (preferably the gas-permeable wall) and serves to eject the cushion from the mold cavity upon completion of the heating/cooling cycle. The surfaces of the mold cavity and the male mold member which contact the fibers are preferably coated with a fluorocarbon (e.g., polytetrafluoroethylene, or the like) to prevent the heated fibers from adhering to such surfaces. Temperature sensors (e.g., thermocouples) are provided in the gas plenums adjacent the gas-permeable walls to measure the gas temperature thereat and provide appropriate signals for controlling the process.

The invention will be better understood when considered in the light of the following detailed description of certain specific embodiments thereof which is given hereafter in conjunction with the several drawings in which:

DESCRIPTION OF THE DRAWINGS

FIGS. 1A–1G schematically depict the several steps of the process;

DETAILED DESCRIPTION OF SPECIFIC EMBODIMENTS OF THE INVENTION

Figure 1E:
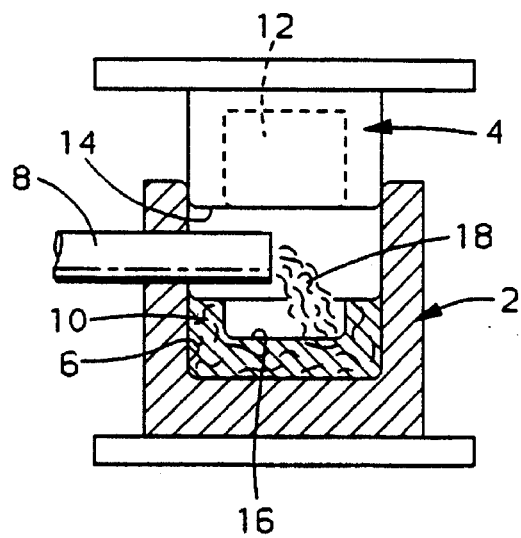

FIG. 1A illustrates the female mold member 2 and male mold member 4 in the open position before fibers are introduced into the cavity 6 from the injector 8. FIG. 1B depicts the beginning of the process wherein the male mold member 4 is in the semi-closed position with respect to the female mold member 2 and the injector 8 extends well into the cavity 6 to dispense the fibers 10 therein. FIG. 1C depicts the injector 8 in the retracted position, and the male mold member 4 fully inserted into the female mold member 2 to compress the fibers 10 in the mold cavity 6. FIG. 1D is like FIG. 1C except it shows a male mold member extension 12 projecting beyond the face 14 of the male mold member 4 to compress the center of the fibers 10 more than the fibers surrounding the extension 12 so as to provide a depression 16 in the bed of fibers 10. In this position, heated gas is blown through the fiber mix 10 to soften the low temperature bonding fibers and unite them to the high temperature matrix fibers. Thereafter cool air is blown through the fiber mix 10 to solidify the low melting fibers and bond them to the high melting fibers. FIG. 1E shows the mold extension 12 retracted into male mold member 4 which itself is raised to the semi-closed position so that the injector 8 may extend back into the cavity 6 in the female mold member 2 for dispensing another mix of fibers 18 into the depression 16 formed in the step shown in FIG. 1D.

Figure 1F:
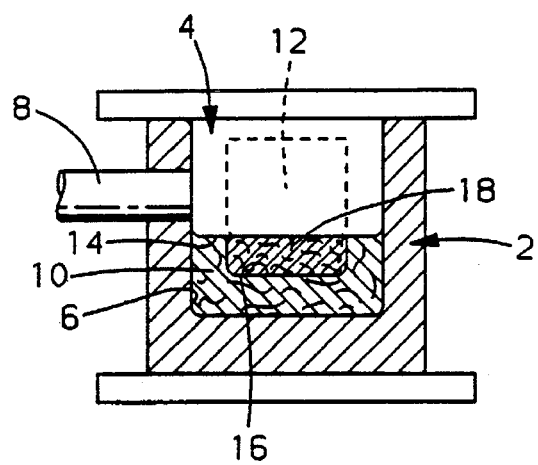

FIG. 1F shows the male mold member 4 reinserted into the female mold member 2 so as to compress the fiber mix 18 in the depression 16. Hot and cool air is then sequentially passed through the fiber mixes 10 and 18 to respectively heat the low melting bonding fibers in the mix 18 to soften and unite them with the high melting matrix fibers, and to thereafter cool the fibers to bond them to the high melting fibers.

Figure 1G:
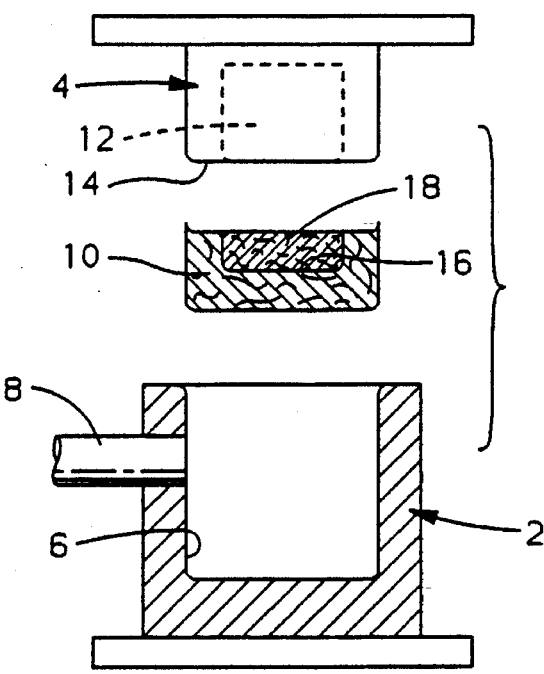

Finally, FIG. 1G shows the male member 4 in a fully opened position, and the cushion formed by the fiber mixtures 10 and 18 ejected from the mold. The process depicted in FIGS. 1A–1G results in the formation of a cushion having a high density fiber region 10 at the perimeter of the cushion and a low density fiber region 18 at the center of the cushion or vice versa. However, any combination of different materials or different degrees of compression may be used to achieve the desired result in a finished cushion.

Figure 2:
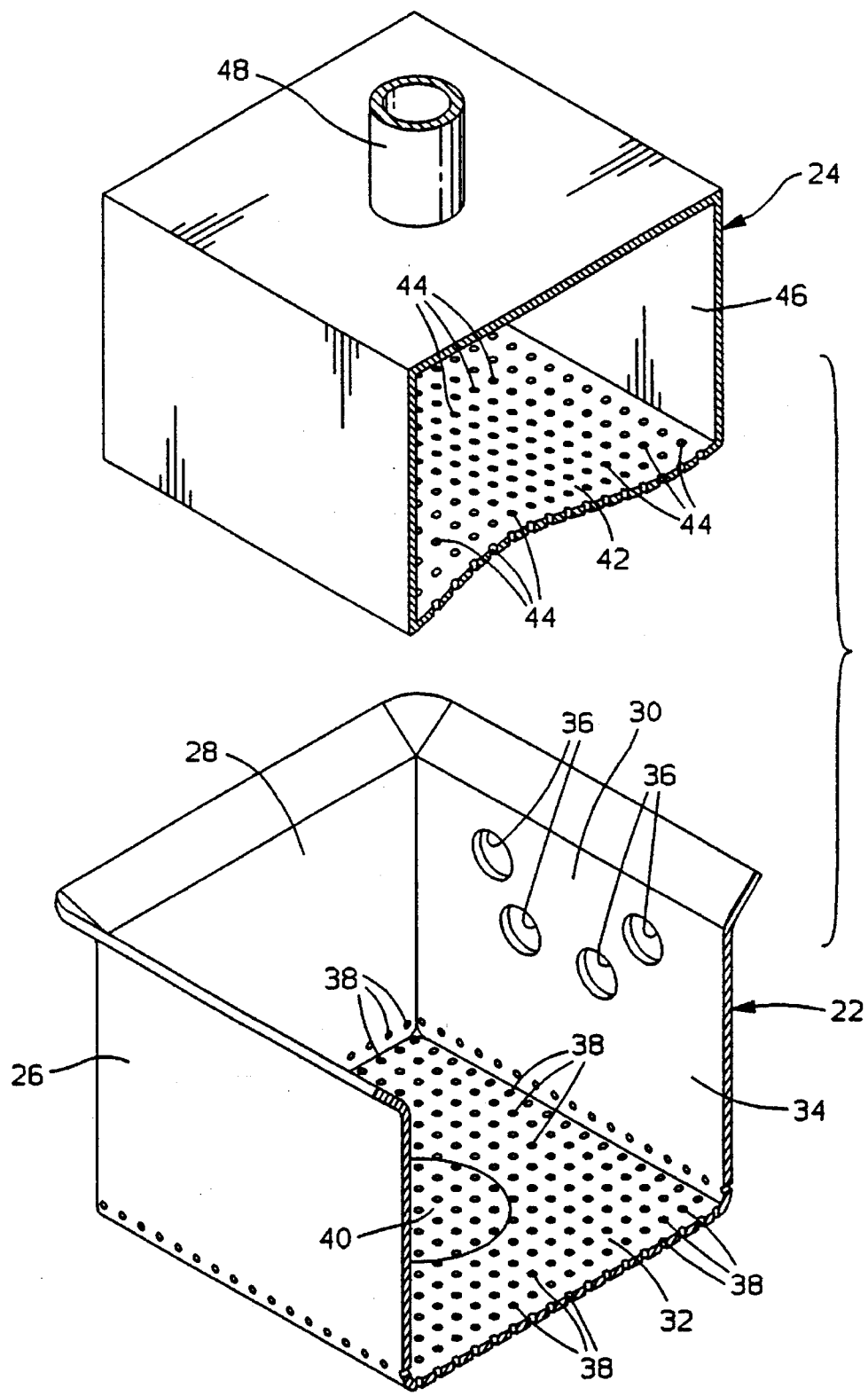
FIG. 2 is a sectioned, perspective view of the male and female mold members in accordance with the present invention.

FIG. 2 illustrates a female mold member 22 and male mold member 24 in the mold open position. The female mold member 22 comprises a plurality of walls 26, 28, 30 and 32 defining a mold cavity 34. A plurality of openings 36 are provided in the side wall 30 to receive injectors from the filling machine, as will be described in more detail hereinafter. The bottom wall 32 of the mold 22 comprises a plurality of apertures 38 so as to render the bottom wall 32 permeable to gas. The centermost portion 40 of the wall 32 serves as a stripper plate for ejecting the cushion from the cavity 34 at the end of the processing cycle as will be described in more detail hereinafter. The male mold member 24 comprises a lower wall 42 for shaping the upper surface of the cushion and has a plurality of apertures 44 therein for rendering the wall 42 gas permeable. The gas-permeable wall 42 is backed up by a plenum 46 which, in turn, is connected to a conduit 48 for exhausting (or providing as appropriate) heating and cooling gases from the plenum 46.

Figure 3:
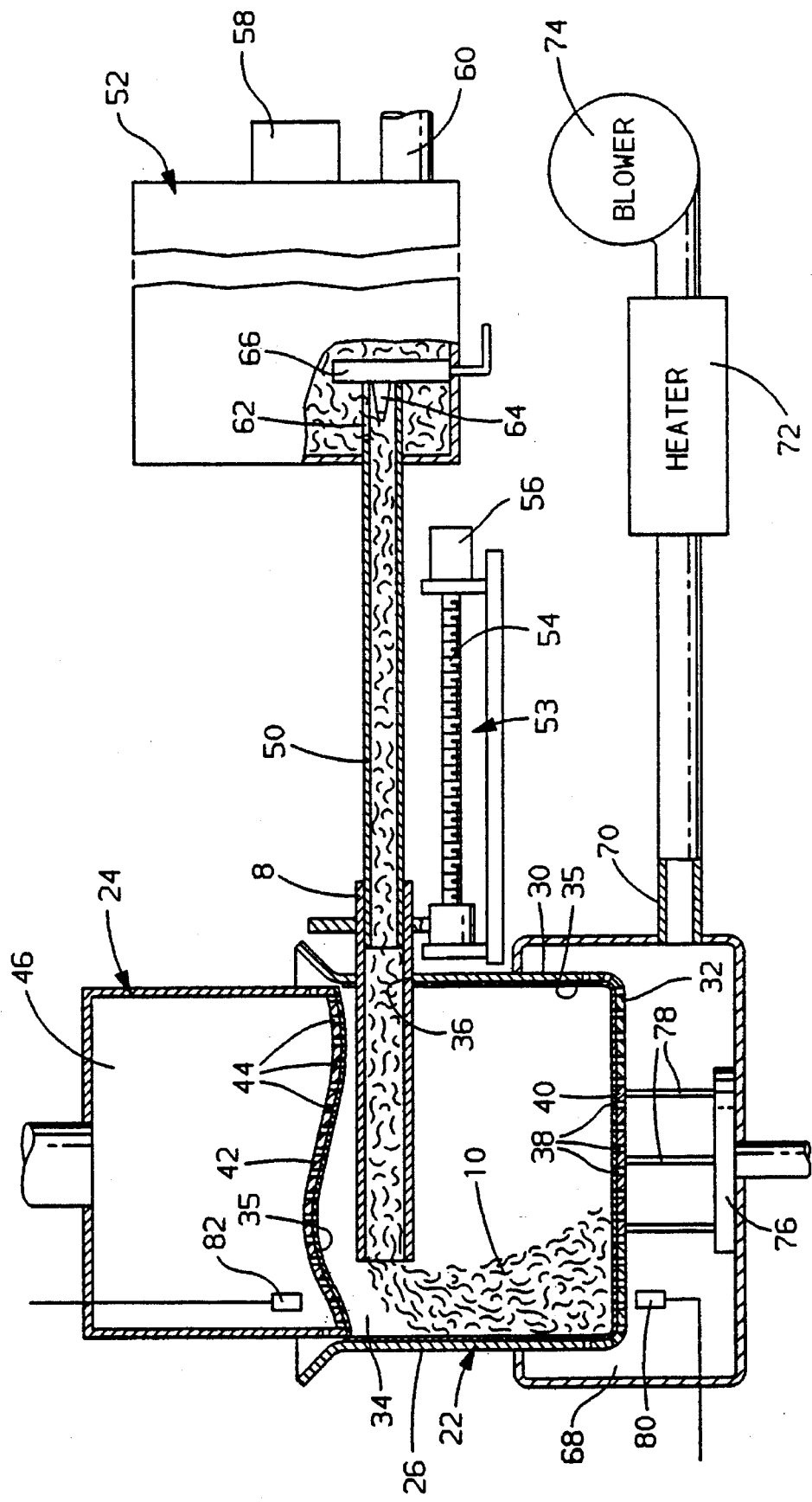
FIGS. 3–5 are partially sectioned, side views of the apparatus of the present invention at different stages in the process.
Figure 4:
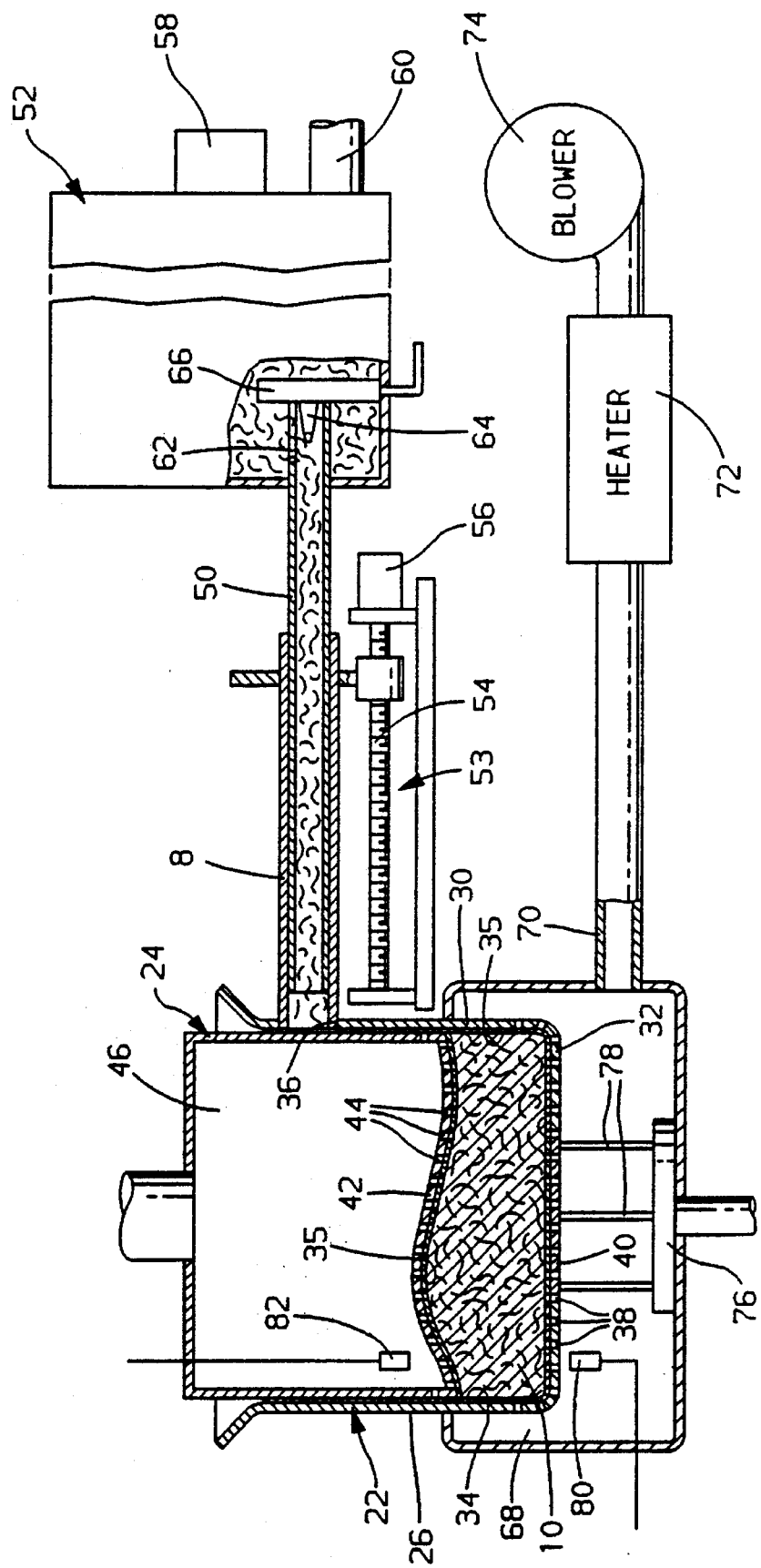
Figure 5:
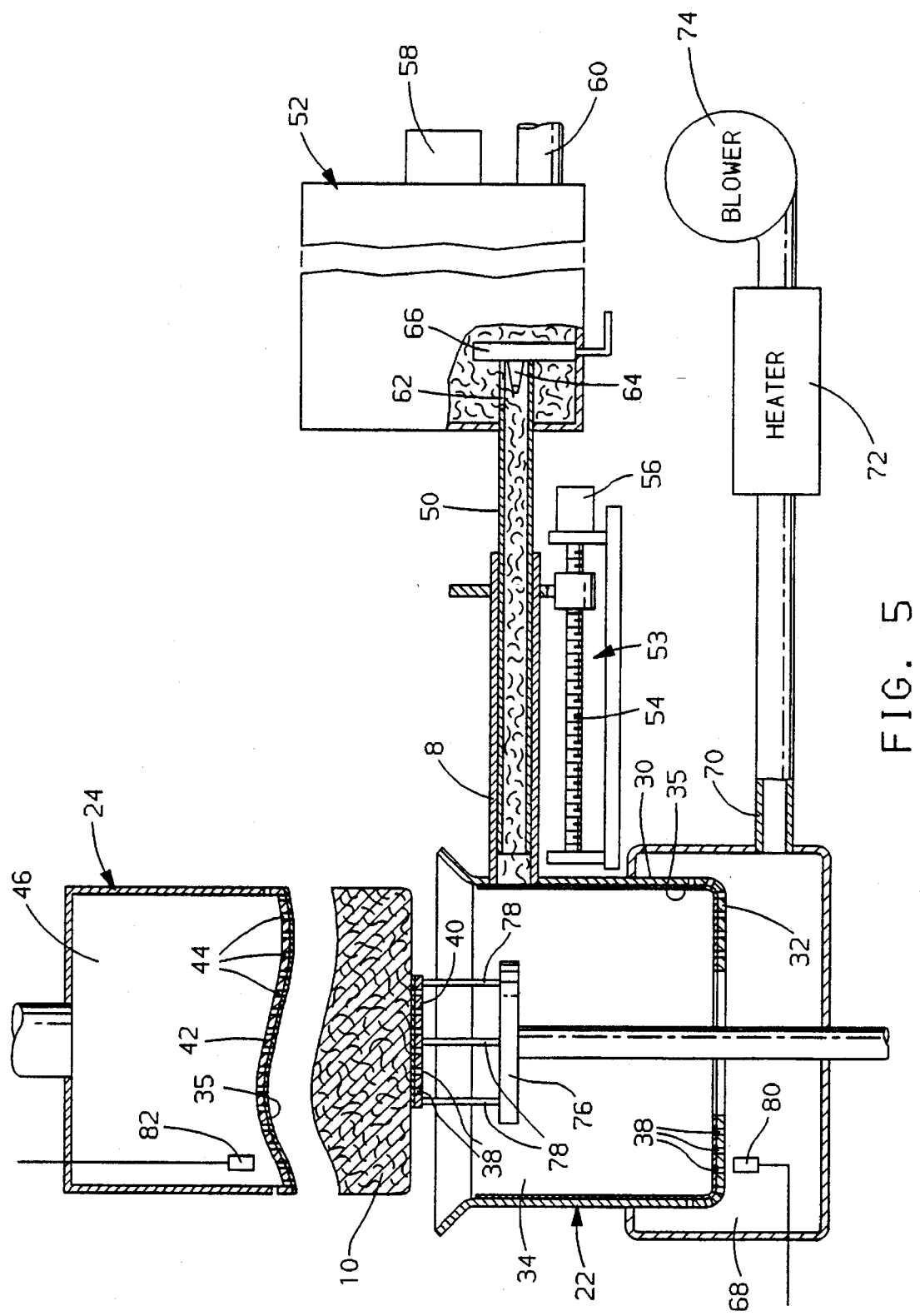

FIGS. 3–5 depict apparatus for making cushions according to the process described above with different components of the apparatus in different positions at various times in the cycle. FIG. 3 shows the apparatus essentially at the beginning of the process with the male mold member 24 in a semi-closed position at the mouth of the cavity 34 in the female mold member 22. The injectors 8 (only one shown) extend through the openings 36 to almost the other side of the mold cavity 34 which is itself, along with the wall 42, coated with a Teflon layer 35. The injector 8 fits in telescoping fashion over a three inch diameter stationary feed tube 50 extending from the filling machine 52 and is caused to move fore and aft by a drive mechanism 53 which is preferably a ball and screw type linear actuator 54 powered by reversible motor 56. Alternative drive mechanisms include pneumatic/hydraulic cylinders, rack and pinion gears, or the like (not shown). The injector 8 moves slowly from the fully extended position shown in FIG. 3 to the retracted position shown in FIG. 4 as it dispenses the fibers 10 into the mold cavity 34 so as to provide a substantially even distribution of the fibers in the cavity 34. At the same time, the plenum 46 in the upper mold member 24 is pressurized with air so as to provide a current of downwardly moving air which serves to help distribute the fibers evenly while packing them in the bottom of the mold cavity 34.

The filling tube 50 is connected to a filling machine 52 which is essentially a commercially available machine marketed for filling pillows with fibers and sold by the Ormont Corporation as their Model No. TRP11 Commander filling machine. That machine essentially includes a motor 58 for driving a plurality of impellers or blades (not shown) inside the machine for keeping the fibers stirred up and airborne in the machine 52. A conduit 60 delivers the fibers to the machine 52 from a remote source thereof (not shown). The end of the filling tube 50 inside the filling machine 52 is open at the top 62 for admitting the airborne fibers to the tube 50. A nozzle 64 mounted to an air manifold 66 emits a jet of air into the filling tube 50 which draws fibers into the tube 50 through the opening 62 and conveys them down the tube 50 through the injector 8 into the mold cavity 34.

The bottom wall 32 of the mold 22 includes a plurality of apertures 38 so as to render the bottom wall permeable to gases. Similarly, the bottom wall 42 of the male mold member 24 contains a plurality of perforations 44 for the same reason. The bottom of the female mold 22, and hence the gas-permeable wall 38, is encompassed by a plenum 68 which is connected to a conduit 70 for supplying or removing the gases from the plenum 58 as needed. A heater 72 is coupled to the conduit 70 and to a blower 74 for heating air passing through the conduit 70 when the blower 74 is energized to pressurize the plenum 68. Needless to say, the direction of air flow may be reversed (from plenum 46 through the cavity 34 and into plenum 68) without departing from the present invention and simply relocating the heater and blower.

A stripper plate 40 forms part of the perforated wall 32 and is connected to an elevator 76 by means of rods 78 for ejecting the cushion from the mold cavity 34 upon completion of the heating/cooling cycle. Temperature sensors 80 and 82 (e.g., thermocouples) are provided in the plenums immediately adjacent the walls 32 and 42 respectively for sensing the temperature of the gas at those locations and sending suitable signals to appropriate controllers (not shown) for controlling/automating the process.

FIG. 4 is like FIG. 3 except that it shows the injector 8 in the fully retracted position along the tube 50, and the male mold member 24 fully seated in the female mold 22 and compressing the fiber mixture 10 to the desired shape. This position is retained during the heating and cooling cycle which begins by the blower 74 pumping gas (i.e., air) through the heater 72 into the conduit 70 and plenum 68, through the gas-permeable wall 32 and the fiber bed 10, and finally exhausting the gas from the bed 10 out the pipe/duct 48 via the gas-permeable wall 42 and plenum 46. Hot air flow continues until the temperature sensed at the sensor 82 approaches that sensed at the sensor 80 which is indicative of the fact that the fibers 10 are substantially uniformly heated throughout and can absorb substantially no additional heat. At this point in time, the heater 72 is shut off, and ambient or cool air pumped into the plenum 68 and through the fiber mixture to cool and bond the low melting point fibers to the high melting point fibers at the intersections thereof. Cooling continues until the temperature at sensor 82 drops to approximately the temperature sensed at sensor 80 which is indicative that the fibers 10 have cooled sufficiently as not to give off any additional heat, and accordingly have bonded the low melting point fibers to the high melting point fibers sufficient for the cushion to retain the shape provided during the compression step.

Finally, and as shown in FIG. 5, after the fibers 10 have cooled sufficiently to fix the shape of the cushion, the male mold member 24 is retracted to the fully opened position and the stripper plate 40 lifted, via the elevator 76, to eject the cushion from the female mold 22. After the cushion is removed the elevator 76 descends until the stripper plate 40 repositions itself with the wall 32.

SPECIFIC EXAMPLE

A seat cushion was made from a mixture of polyethylene terephthalate fibers comprising 75% by volume matrix fibers manufactured by the Hoechst Celanese Co. under the trade name Trevira, and 25% by volume bonding fibers manufactured by the Hoechst Celanese Co. under the trade name Celbond. The matrix fibers varied in length from about 1¼ inches to about 1½ inches, and in diameter from about 15 denier to about 25 denier. The matrix fibers had a melting point of about 250° C. and the bonding fibers had a melting point of about 200° C. The fiber mix was compressed in a mold to a density of about 2.25 lbs./ft.$^3$, and heated air passed therethrough at a temperature of 210° C. and at a rate of 500 CFM for a period of five minutes. Thereafter, room temperature air replaced the hot air and flowed through the heated fibers at a rate of 500 CFM for about ten minutes until the temperature of the air exiting the fibers fell below 80° C. The mold was then opened and the cushion ejected therefrom.

While the invention has been disclosed in terms of certain specific embodiments thereof, it is not intended to be limited thereto, but rather only to the extent set forth hereafter in the claims which follow.

The embodiments of the invention in which an exclusive property or privilege is claimed are defined as follows:

1. A method of molding a porous, breathable cushion comprising the steps of:

a. dispensing a mixture of polymeric matrix fibers having a first melting point and polymeric bonding fibers having a second melting point lower than said first melting point into a mold having a moveable member moveable between a mold-open and a mold-closed position so as to define a cavity conforming substantially to the desired shape of said cushion in the mold-closed position;

b. moving said moveable member to said mold-closed position following said dispensing so as to compress said fibers in said mold cavity to a desired density; and then c. passing a heated gas through the compressed mixture for a time and at a temperature sufficient to soften said bonding fibers and unite them with said matrix fibers at their points of intersection;

d. passing a cooling gas through the compressed mixture for a time and at a temperature sufficient to bond said bonding fibers to said matrix fibers such that said mixture retains said shape after said mold is opened; and e. removing said cushion from said cavity.

2. A method according to claim 1 wherein said gas is air.

3. A method according to claim 1 wherein said matrix and bonding fibers comprise polyethylene terephthalate.

4. A method according to claim 1 including the additional step of blowing a current of air downwardly onto said mixture during said dispensing to pack and help distribute said fibers substantially evenly in said cavity.

5. A method according to claim 1 wherein said dispensing is effected by blowing said mixture into said mold cavity progressively from one end of said mold to the other end thereof.

6. A method according to claim 1 wherein said melting points are at least about 60° C. apart.

7. A method according to claim 1 wherein the melting point of said matrix fiber is at least about 250° C., and the melting point of said bonding fiber is about 150° C. to about 210° C.

8. A method according to claim 1 including, after step (b), further compressing a selected portion of said mixture in said cavity to form a depression therein, and, after step (d), dispensing into said depression a second mixture of second polymeric matrix fibers and second polymeric bonding fibers having a melting point which is lower than the melting point of the second matrix fibers, compressing said second mixture in said depression, passing a heated gas through said second mixture for a time and at a temperature sufficient to soften said second bonding fibers and unite them with said second matrix fibers at their points of intersection, and cooling said second mixture sufficiently to bond said second bonding fibers to said second matrix fibers and to said first mixture such that said second mixture retains said shape after said compressing is terminated.

9. A method according to claim 8 wherein said second mixture is essentially the same as said first mixture and the extent of said compressing of said second mixture is different than the extent of said compressing of said first mixture so as to produce zones of said cushion having different densities.

10. A method according to claim 8 wherein said second mixture is different than said first mixture so as to produce zones of said cushion having different degrees of softness.

11. A method according to claim 1 including the steps of monitoring the temperatures of the gas entering and leaving the cavity while passing said heated gas through said mixture, and discontinuing said passing of said heated gas when the temperature of the leaving gas is about equal to the temperature of the entering gas.

12. Apparatus for molding and bonding a mixture of relatively high-melting point polymeric matrix fibers and relatively low-melting point polymeric bonding fibers together into a compressible, breathable cushion comprising:

a. a female mold member comprising a plurality of walls defining a mold cavity, at least one of said walls being gas-permeable;

b. at least one injector for dispensing said mixture into said cavity;

c. a source of said mixture connected to said injector for supplying said mixture to said injector;

d. a male mold member adapted for reciprocal movement into and out of said mold cavity for compressing said mixture in said cavity, said male mold member having a gas-permeable wall for shaping said cushion in said cavity;

e. a gas plenum system contiguous said gas-permeable walls for providing gas to said mold cavity for heating and cooling said mixture in said cavity;

f. a blower communicating with said plenum system for moving said gas through said system and said mixture; and g. a heater for heating said gas in said system to a temperature sufficient to soften said low-melting fibers and unite them to said high-melting fibers.

13. Apparatus according to claim 12 further including a stripper plate engaging said cushion in said cavity for ejecting said cushion from said cavity after said fibers have been united and cooled sufficiently to form a self sustaining cushion.

14. Apparatus according to claim 12 wherein said injector reciprocates into said cavity to dispense said mixture therein and out of said cavity to permit unimpeded movement of said male mold member into said cavity to compress and shape said mixture therein.

15. Apparatus according to claim 14 including a drive mechanism for reciprocating said injector into and out of said cavity.

16. Apparatus according to claim 15 wherein said drive mechanism initially extends said injector well into said cavity at the beginning of the fiber fill cycle, and thereafter slowly retracts the injector during the course of the fill cycle to distribute the fiber mixture substantially evenly throughout the cavity.

17. Apparatus according to claim 16 wherein said drive mechanism comprises a ball and screw type linear actuator.

18. Apparatus according to claim 12 wherein said source of said mixture includes a hopper for keeping said mixture airborne and a nozzle directing a jet of gas into the end of said injector opposite the mold end of the injector so as to create a vacuum thereat sufficient to draw said airborne mixture into said injector and convey them into said cavity.

19. Apparatus according to claim 12 wherein said stripper plate forms part of said gas-permeable wall of said female mold, and is energized through said plenum.

20. Apparatus according to claim 12 including a first sensor in said plenum system adjacent said gas-permeable wall of said female mold portion and a second sensor in said plenum system adjacent said gas-permeable wall of said male mold member for sensing the temperature of the gases entering and exiting the mold cavity, and a controller responsive to said sensors for controlling the method.

21. A method of molding a porous, breathable cushion comprising the steps of:

a. dispensing a mixture of polymeric matrix fibers having a first melting point and polymeric bonding fibers having a second melting point lower than said first melting point into a mold having a cavity conforming substantially to the desired shape of said cushion;

b. closing said mold so as to compress said fibers in said mold cavity to a desired density; and then c. passing a heated gas through the compressed mixture for a time and at a temperature sufficient to soften said bonding fibers and unite them with said matrix fibers at their points of intersection;

d. monitoring the temperatures of the gas entering and leaving the cavity while passing said heated gas through said mixture;

e. discontinuing said passing of said heated gas when the temperature of the leaving gas is about equal to the temperature of the entering gas; and then f. passing a cooling gas through the compressed mixture for a time and at a temperature sufficient to bond said bonding fibers to said matrix fibers such that said mixture retains said shape after said mold is opened.

22. A method of molding a porous, breathable cushion comprising the steps of:

a. dispensing a mixture of polymeric matrix fibers having a first melting point and polymeric bonding fibers having a second melting point lower than said first melting point into a mold having a cavity conforming substantially to the desired shape of said cushion;

b. closing said mold so as to compress said fibers in said mold cavity to a desired density;

c. further compressing a selected portion of said mixture in said cavity to form a depression therein;

d. passing a heated gas through the compressed mixture for a time and at a temperature sufficient to soften said bonding fibers and unite them with said matrix fibers at their points of intersection;

e. passing a cooling gas through the compressed mixture for a time and at a temperature sufficient to bond said bonding fibers to said matrix fibers such that said mixture retains said shape after said mold is opened;

f. dispensing into said depression a second mixture of second polymeric matrix fibers and second polymeric bonding fibers having a melting point which is lower than the melting point of the second matrix fibers;

g. compressing said second mixture in said depression;

h. passing a heated gas through the second compressed mixture for a time and at a temperature sufficient to soften said second bonding fibers and unite them with said matrix fibers at their points of intersection; and i. cooling said second mixture sufficiently to bond second bonding fibers to said second matrix fibers and to said first mixture such that said second mixture retains said shape after said compressing is terminated.

23. A method according to claim 22 wherein said second mixture is essentially the same as said first mixture and the extent of said compressing of said second mixture is different than the extent of said compressing of said first mixture so as to produce zones of said cushion having different densities.

24. A method according to claim 22 wherein said second mixture is different than said first mixture so as to produce zones of said cushion having different degrees of softness.

25. A method of molding a porous, breathable cushion comprising the steps of:

a. injecting a mixture of polymeric fibers directly into a mold having a moveable member defining a cavity conforming substantially to the desired shape of said cushion, said mold having a mold-open position with said member in a retracted position during said injecting and a mold-closed position with said moveable member in an extended position mating with a stationary mold member, and said mixture comprising a plurality of matrix fibers having a first melting point and a plurality of bonding fibers having a second melting point;

b. extending said moveable member so as to close said mold and compress said fibers in said mold cavity to a desired density; and then c. passing a heated gas through the compressed mixture for a time and at a temperature sufficient to soften said bonding fibers and unite them with said matrix fibers at their points of intersection;

d. passing a cooling gas through the compressed mixture for a time and at a temperature sufficient to bond said bonding fibers to said matrix fibers such that said mixture retains said shape after said mold is opened; and e. removing said cushion from said cavity.

26. A method according to claim 25 wherein said gas is air.

27. A method according to claim 25 wherein said matrix and bonding fibers comprise polyethylene terephthalate.

28. A method according to claim 25 including the additional step of blowing a current of air downwardly onto said mixture during said injecting to pack and help distribute said fibers substantially evenly in said cavity.

29. A method according to claim 25 wherein said injecting is effected by blowing said mixture into said mold cavity progressively from one end of said mold to the other end thereof.

30. A method according to claim 25 wherein said melting points are at least about 60° C. apart.

31. A method according to claim 25 wherein the melting point of said matrix fiber is at least about 250° C., and the melting point of said bonding fiber is about 150° C. to about 210° C.

32. A method according to claim 25 including, after step (b), further compressing a selected portion of said mixture in said cavity to form a depression therein, and, after step (d), injecting into said depression a second mixture of second polymeric matrix fibers and second polymeric bonding fibers having a melting point which is lower than the melting point of the second matrix fiber, compressing said second mixture in said depression, passing a heated gas through the compressed second mixture for a time and at a temperature sufficient to soften said second bonding fibers and unite it with said second matrix fibers at their points of intersection, and cooling said second mixture sufficiently to bond said second bonding fibers to said second matrix fibers and to said first mixture such that said second mixture retains said shape after said compressing is terminated.

33. A method according to claim 32 wherein said second mixture is essentially the same as said first mixture and the extent of said compressing of said second mixture is different than the extent of said compressing of said first mixture so as to produce zones of said cushion having different densities.

34. A method according to claim 32 wherein said second mixture is different than said first mixture so as to produce zones of said cushion having different degrees of softness.

35. A method according to claim 25 including the steps of monitoring the temperatures of the gas entering and leaving the cavity while passing said heated gas through said mixture, and discontinuing said passing of said heated gas when the temperature of the leaving gas is about equal to the temperature of the entering gas.

\* \* \* \* \*